US012674525B2

(12) United States Patent
Kolb

(10) Patent No.: US 12,674,525 B2
(45) Date of Patent: Jul. 7, 2026

(54) SYSTEM TO ALIGN AND INSTALL LARGE PIPE FITTINGS

(71) Applicant: John C. Kolb, Aiea, HI (US)

(72) Inventor: John C. Kolb, Aiea, HI (US)

( * ) Notice: Subject to any disclaimer, the term of this patent is extended or adjusted under 35 U.S.C. 154(b) by 344 days.

(21) Appl. No.: 18/209,728

(22) Filed: Jun. 14, 2023

(65) Prior Publication Data

US 2023/0407991 A1 Dec. 21, 2023

Related U.S. Application Data

(60) Provisional application No. 63/352,677, filed on Jun. 16, 2022.

(51) Int. Cl.
*F16L 1/10* (2006.01)
*B66C 1/12* (2006.01)

(52) U.S. Cl.
CPC . *F16L 1/10* (2013.01); *B66C 1/12* (2013.01)

(58) Field of Classification Search
CPC ....... F16L 1/10; F16L 1/00; F16L 1/15; F16L 1/23; B66C 1/12; B66C 1/0256; B66C 1/14; B66C 1/34
See application file for complete search history.

(56) References Cited

U.S. PATENT DOCUMENTS

| | | | |
|---|---|---|---|
| 3,015,883 A | 1/1962 | Brown | |
| 2011/0042936 A1* | 2/2011 | Andrews | F16L 27/0832 285/94 |

| | | | | |
|---|---|---|---|---|
| 2015/0361737 A1* | 12/2015 | Foley | | E21B 19/06 294/106 |
| 2016/0052750 A1 | 2/2016 | Anderson et al. | | |
| 2016/0137463 A1* | 5/2016 | LaValley | | B66C 1/427 414/800 |
| 2016/0356390 A1* | 12/2016 | Gifford | | F16K 27/04 |
| 2020/0284382 A1* | 9/2020 | Lenz | | F16B 2/08 |
| 2023/0125572 A1* | 4/2023 | Nalawade | | E02F 3/963 294/119.1 |
| 2023/0407991 A1* | 12/2023 | Kolb | | F16L 1/10 |

FOREIGN PATENT DOCUMENTS

| | | |
|---|---|---|
| CN | 105923532 A | 9/2016 |
| CN | 110422752 B | 9/2020 |
| JP | 2000199582 A | 7/2000 |

OTHER PUBLICATIONS

International Search Report and Written Opinion in related International Application No. PCT/US2023/025335, mailed Sep. 8, 2023, 7 pages.

* cited by examiner

*Primary Examiner* — Lee D Wilson
(74) *Attorney, Agent, or Firm* — FisherBroyles, LLP; Robert Kinberg

(57) ABSTRACT

A system to suspend, move, place, align and clamp upper and lower pipe fitting portions of a pipe fitting to each other around an existing pipe. The system includes an upper lift assembly configured to attach to an upper pipe fitting portion and a lower lift assembly configured to attach to a lower pipe fitting portion. The upper lift assembly is connectable to the lower lift assembly by a suspension arrangement such that when the suspension is attached to both the lower lift assembly and the upper lift assembly the upper and lower pipe fitting sections of a pipe fitting become aligned and pressed together.

14 Claims, 12 Drawing Sheets

SYSTEM TO ALIGN AND INSTALL LARGE PIPE FITTINGS

RELATIONSHIP TO PRE-EXISTING APPLICATIONS

This U.S. non-provisional application claims priority to Provisional Application No. 63/352,677 filed in the United States Patent and Trademark Office on Jun. 16, 2022.

BACKGROUND OF THE INVENTION

The invention relates to a system to suspend, move, place, align and clamp in place large pipe fittings around existing large pipes used for transportation of water, gas, etc. FIG. 1 illustrates a widely used large pipe fitting 50 to connect to large pipes used for water and gas delivery. A large pipe fitting may be any pipe fitting for a pipe having an outside diameter of 4" or more. For example, when it is desired to add a new flow direction to a large pipe, the large pipe fitting 50 can be used to add this new flow direction. Within this family of fittings is another type of fitting which for example, is used to stop off the flow of oil, gas, water etc. These widely used large pipe fittings 50 generally include an upper fitting portion 50a and a lower fitting portion 50b (shown upside down in FIG. 1), which wrap around an existing pipe and are then welded together. An additional pipe can be connected to an opening 50b1 in the lower fitting portion 50b. Installation of these large pipe fittings 50 have been tedious endeavors in the past, requiring multiple personnel to suspend, move, place, align and then clamp the lower fitting portion 50b to the upper fitting portion 50a. In other words, the installers would position the upper and lower fitting portions 50a, 50b on a large pipe, using a combination of manual labor and equipment such as a crane, an excavator, or backhoe, or any similar equipment, wherein after the upper fitting 50a was lifted and placed on top of the large pipe with use of heavy equipment and manual labor, and the lower fitting portion 50b would be moved, placed, aligned and fixed to the upper fitting portion 50a using manual labor. The traditional methods resulted in significant personal injury risk to the installers due to a high potential of the upper fitting portion 50a to roll over and potentially maim, crush or otherwise injure the installers. The traditional methods require several man-hours in order to properly align the large fitting 50 with a significant probability of the upper and lower pipe fitting portions 50a, 50b being mis-aligned due to off axis stress being introduced into the fitting assembly 50. The traditional methods of installing these types of large pipe fittings 50 only allow the installers to tack the upper and lower pipe fitting portions 50a, 50b in place until all obstacles are removed, at which time the installer must weld the large pipe fitting 50 in a full "root pass," which is a well-known term used for a first weld bead placed in a weld joint in a multi-pass weld.

Accordingly, there is a need for a system that eliminates the need for an installer to manually position both upper and lower portions of a large pipe fitting onto large pipes.

There is also a need for a system that is configured so that the large mechanical equipment is always connected to the upper and lower pipe fitting portions in order to prevent the fitting from being able to roll over and potentially crush, maim or otherwise injure the installer.

There is also a need for a system that requires only one installer to install the system on a large pipe and one operator to run large mechanical equipment, thus significantly reducing the time and labor costs required to install a large pipe fitting.

There is also a need for a system that enables an installer of a large pipe fitting to bring the lower pipe fitting portion up into position in alignment with the upper pipe fitting portion under a smooth and controlled force.

There is also a need for a system that enables a lower pipe fitting portion of a large pipe fitting to be pressed against a pipe and an upper pipe fitting portion of the large pipe fitting to ensure equal distribution of forces for proper alignment of the lower pipe fitting portion with the pipe and the upper pipe fitting portion.

There is also a need for a system to align and install large pipe fittings which will clamp a lower pipe fitting portion to an upper pipe fitting portion of the large pipe fitting during welding together of the pipe fitting portions, especially during welding of the root pass and top passes, which saves significant amounts of time and labor, as well as enabling an optimum quality weld.

SUMMARY OF THE INVENTION

The present invention provides a system, including an upper lift assembly and a lower lift assembly, to secure thereto, hoist, move, place and assemble upper and lower pipe fittings of a large pipe fitting together onto a large pipe used for transportation and delivery of water, gas, etc.

The foregoing and/or other features and utilities of the invention may be achieved by providing a system for moving, placing, aligning and clamping upper and lower pipe fitting portions of a pipe fitting around an exterior surface of an existing pipe of a type used for transporting fluid such as water, oil and gas, the existing pipe having a central longitudinal axis, and the upper and lower pipe fitting portions each include an interior surface having a semicircular cross section and two parallel longitudinal edges spaced apart by a distance corresponding to an outside diameter of the existing pipe around which they are to be installed, wherein the upper pipe fitting portion has a planar top surface, the system comprising: an upper lift assembly comprising: a first sub-assembly constructed to be releasably fixed to the planar top surface of the upper pipe fitting portion, and a second sub-assembly arranged to be releasably slidable in a direction perpendicular to the planar top surface of the upper pipe fitting portion and having a connector to connect the first sub-assembly to a work machine for moving and placing the upper lift assembly together with the upper pipe fitting portion above the existing pipe; and a lower lift assembly configured to form a cradle system to receive and releasably hold a bottom region of the lower pipe fitting portion and a suspension arrangement to suspend the cradle system from the second sub-assembly of the upper lift assembly; wherein when the second sub-assembly is released to slide relative to the first sub-assembly in the upper lift assembly, an upward force applied from an external source to the second sub-assembly causes an upward movement of the second sub-assembly relative to the first sub-assembly and the upper pipe fitting portion which, because of the suspension system moves the lower lift assembly with the lower pipe fitting portion upwards to bring the horizontal edges of the lower pipe fitting portion into contact with the horizontal edges of the upper fitting portion.

According to another embodiment, the invention may be achieved by providing a system to suspend, move, place, align and clamp upper and lower lift portions of pipe fittings, comprising; an upper lift assembly including a chevron-shaped lift frame having a hole disposed through a center thereof and first and second sides, each of the first and second sides including a pin-hole formed therethrough, a groove formed at a bottom thereof and a horizontal support arm connected at an end thereof, each horizontal support arm including a hook attached to first and second ends thereof; a pair of crow's foot vertical runner assemblies [also referred to herein as L-shaped members] each including: a vertical section having a slot formed lengthwise therein to receive one of the first or second sides of the lift frame and to rest in a corresponding groove formed in the lift frame, and a pin-hole formed widthwise therethrough to align with a corresponding pin-hole in the lift frame, and a horizontal section including at least one notch formed therein to slide under a corresponding bolt fixed to an upper portion of a pipe fitting; and a first quick release pin configured to be inserted through each aligned pin-hole in the lift frame and crow's foot vertical runner assembly to connect the crow's foot vertical runner to the corresponding pin-hole in the lift frame; a lower lift assembly including two cross-bars disposed in parallel and two square bars disposed in parallel, ends of the cross-bars including threads thereon to threadingly engage one of the ends of the square bars to form square cradle, the square bars each including eye holes disposed through each end thereof and a track formed at a center of a first side thereof, each track being configured to receive one end of a lower pipe fitting therein; a threaded fastener including threads formed therein configured to thread onto a respective end of a cross-bar to force the square bars toward each other to secure the ends of the lower pipe fitting within the tracks; a safety latch releasably attachable to the center of each square bar at a second side thereof and including a rotatable safety hook configured to rotate to a position directly above the track to lock the end of a lower pipe fitting within the corresponding track and a second quick release pin to lock the safety hook above the corresponding track; and four chains, each chain having a first end connected to a respective eye hole in one of the square bars and a second end having a shackle connected thereto to be hooked to a respective one of the hooks attached to the ends of the horizontal support arms such that the two tracks become directly aligned under a respective one of the crow's foot vertical runner assemblies when the four shackles are hooked to respective ones of the hooks In another embodiment, the system can further comprise an anti-tilt guide block attached to each side of the first and second sides of the lift frame such that the vertical section of respective crow's foot vertical runner assemblies slides along the anti-tilt blocks when receiving the corresponding first or second side of the lift frame through the slot.

In another embodiment, the at least one notch formed in the horizontal section of the crow's foot vertical runner assembly includes two notches disposed adjacent to each other to correspond with two bolts disposed in the upper portion of the pipe fitting.

In another embodiment, the system can further comprise a jack configured to rest between the top center of the upper pipe fitting and the center bottom portion of the lift frame to force the upper lift assembly away from the upper portion of the pipe fitting and force the lower lift assembly toward the upper portion of the pipe fitting when the both quick release pins are removed from the pin-holes in the lift frame and the crow's foot vertical runner assembly.

In still another embodiment, the threaded fasteners each include a pair of ball handles thereon to tighten the fastener onto the threads of the crossbar.

In still another embodiment, the upper lift assembly, the lower lift assembly and the pair of crow's foot vertical runner assemblies are formed of steel or iron.

According to another embodiment there is provided a system to suspend, move, place, align and clamp together upper and lower pipe fitting sections of a pipe fitting around an existing pipe, the system comprising; an upper lift assembly including a chevron-shaped bar having a hole disposed through a center thereof and a cross-bar attached to the ends of the first and second sides of the chevron-shaped bar such that the cross-bars are disposed in parallel, each cross-bar having a hook attached to first and second ends thereof via a corresponding shackle; a pair of L-shaped members each including: a first section including a slot formed lengthwise therein to receive one of the first or second sides of the chevron-shaped bar and an engagement device to lockingly engage each L-shaped member with the respective first or second sides of the chevron-shaped bar; and a second section including at least one notch formed therein to slide under a corresponding bolt fixed to an upper pipe fitting section of a pipe fitting; a lower lift assembly configured to include two movable square bars disposed in parallel, each square bar having an eye hole disposed through ends thereof and a track formed at a center on a first side thereof, each track configured to receive one end of a lower pipe fitting section therein and secured therein when the square bars are moved toward each other; a safety latch releasably attachable to the center of each square bar at a second side thereof and including a rotatable safety hook configured to rotate to a position directly above the track and a pin-hole to receive a second quick release pin therein to lock the safety hook above the track to secure the end of the lower pipe fitting section within the respective track; and four chains, each chain having a first end connected to a respective eye hole in one of the square bars and a second end having a shackle connected thereto to be hooked to a respective one of the hooks attached to the ends of the cross-bars such that the track in the square bars become directly aligned under a respective one of the crow's foot vertical runner assemblies when the four chains are connected to four respective hooks.

In an embodiment, the engagement device to lockingly engage each L-shaped member with the respective first or second sides of the chevron-shaped bar can comprise: a pin-hole extending through a width of the first section of each L-shaped member; a pin-hole formed through the first and second sides of the chevron-shaped bar; and a first quick release pin configured to be inserted through each of the aligned pin-holes in the chevron-shaped bar and the first section of the L-shaped member to lockingly engage the L-shaped members to the respective sides of the chevron-shaped bar In another embodiment, the first and second sides of the chevron-shaped bar can further include: an anti-tilt guide block disposed on each side thereof such that one side of the first section of each L-shaped member rests against the anti-tilt blocks when the first or second side of the chevron-shaped bar is inserted into the slot formed in the first section of each L-shaped member; and a groove formed at the bottom thereof directly under a corresponding one of the pin-holes such that when the pin-holes of the chevron-shaped bar are aligned with the pin-holes of the L-shaped members a bottom of the slot in each L-shaped member rests securely within the respective groove formed in the chevron-shaped bar.

In still another embodiment, the at least one notch formed in the second section of the L-shaped member includes two notches disposed adjacent to each other.

The foregoing and/or other features and utilities of the present general inventive concept may also be achieved by providing a method of suspending, moving, placing, aligning, and clamping upper and lower portions of pipe fittings together around an existing pipe, the method comprising: engaging a first portion (also referred to herein as a first sub-assembly) of a first assembly to an upper portion of a pipe fitting and removably attaching the first portion of the first assembly to a second portion (also referred to herein as a second sub-assembly of the first assembly; engaging a lower portion of a pipe fitting to a second assembly; connecting a first side of the first portion of the first assembly to a first side of the second assembly with a pair of chains or cables; lifting the first assembly until both the first assembly and the second assembly are suspended in air; swinging a second opposite side of the second assembly toward a second opposite side of the first portion of the first assembly until the lower portion of the pipe fitting is directly under and aligned with the upper portion of the pipe fitting; connecting the second side of the second assembly to the second side of the portion of the first assembly; detaching the first and second portions of the first assembly; and forcing the second portion of the first assembly away from the first portion of the first assembly while the first portion of the first assembly remains engaged with the upper portion of the pipe fitting such that the second assembly is raised to force the lower portion of the pipe fitting against the upper portion of the pipe fitting to align and clamp together the upper and lower portions of the pipe fitting.

In an embodiment, the engaging a lower portion of a pipe fitting to a second assembly includes press fitting ends of the lower portion of the pipe fitting between two opposing sides of the second assembly.

In another embodiment, the engaging a lower portion of a pipe fitting to a second assembly includes rotating a retractable safety latch formed at each of the two opposing sides of the second assembly over the two opposing ends of the lower pipe fitting.

In still another embodiment, the forcing of the second portion of the first assembly away from the first portion of the first assembly while the first portion of the first assembly remains engaged with the upper portion of the pipe fitting is performed by applying a lifting device between the upper portion of the pipe fitting and the second portion of the first assembly and activating the lifting device.

In still another embodiment, the attaching and detaching the first portion of the first assembly and the second portion of the first assembly is performed by inserting and removing both quick release pin from aligned pin holes formed in both the first and second portions of the first assembly.

The foregoing and/or other features and utilities of the present invention may also be achieved by providing a method of suspending, moving, placing, aligning and clamping upper and lower portions of pipe fittings together around an existing pipe for a follow on act, the method comprising: engaging a first assembly to an upper portion of a pipe fitting; engaging a second assembly to a lower portion of a pipe fitting; connecting a first side of the first assembly to a first side of the second assembly; lifting the first assembly until both the first assembly and the second assembly are suspended in air; placing the upper pipe fitting portion on top of the existing pipe; swinging a second opposite side of the second assembly toward a second opposite side of the first assembly until the lower pipe fitting portion is directly under and aligned with the upper pipe fitting portion; ensuring the longitudinal axes are aligned, connecting the second side of the second assembly to the second side of the first assembly; and pressing the lower pipe fitting portion and the upper pipe fitting portion together.

BRIEF DESCRIPTION OF THE DRAWINGS

The above and/or other features and utilities of the invention will become apparent and more readily appreciated from the following description of the embodiments, taken in conjunction with the accompanying drawings of which:

FIG. 6 illustrates a top view of the lower lift assembly illustrated in FIGS. 2 and 5 without the chains attached;

FIG. 7 illustrates a bottom-side perspective view of a retractable safety latch assembly of the lower lift assembly illustrated in FIG. 5, according to an embodiment of the invention;

Figure 1:
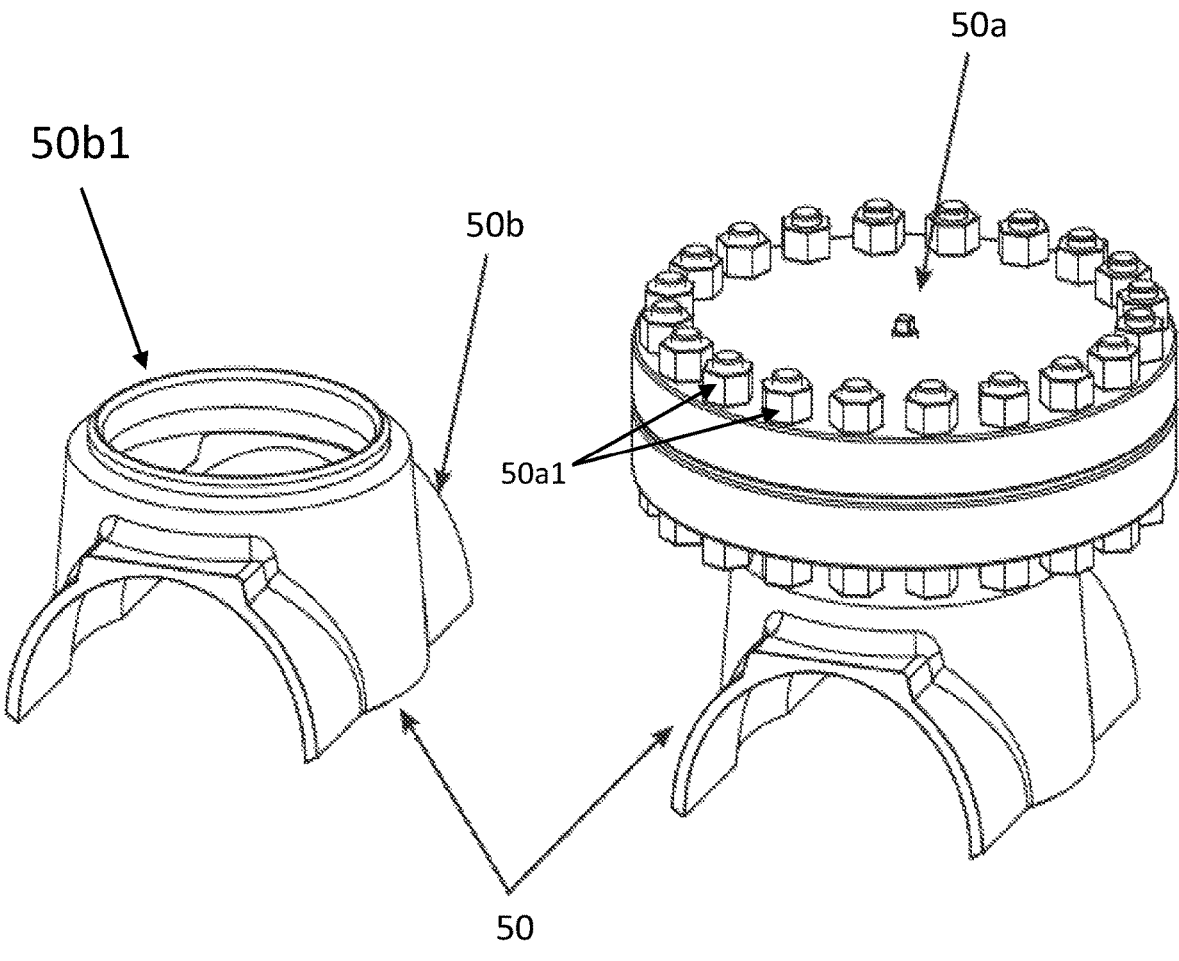
FIG. 1 illustrates a widely used large pipe fitting for adding new pipe paths for water and gas transportation and delivery.

The drawings illustrate a few embodiments of the invention, and are not to be considered limiting in its scope, as the overall inventive concept may admit to other equally effective embodiments. The elements and features shown in the drawings are to scale and attempt to clearly illustrate the principles of the described embodiments of the invention.

DETAILED DESCRIPTION OF THE INVENTION

Reference will now be made in detail to embodiments of the invention, examples of which are illustrated in the accompanying drawings, wherein like reference numerals refer to the like elements throughout. While describing the invention, detailed descriptions about related well-known functions or configurations that may diminish the clarity of the points of the invention are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more embodiments of the present general inventive concept will be described in detail with reference to accompanying drawings.

The described and illustrated embodiments of the invention are directed to a system to suspend, move, place, align and clamp for the purposes of assembling upper and lower portions of large pipe fittings to large pipes used for transportation and delivery of water, gas, etc. More particularly, but not exclusively, the invention relates to a system, including an upper lift assembly and a lower lift assembly, to secure thereto, suspend, move, place, align and clamp for the purposes of assembling large upper and lower pipe fittings together onto large pipes used for transportation and delivery of water, gas, etc.

As discussed above, FIG. 1 illustrates a commonly and widely used large pipe fitting 50 to connect around an existing pipe for underground and above ground water and gas transportation and delivery. These widely used large pipe fittings 50 generally include an upper fitting portion 50a and a lower fitting portion 50b, which wrap around an existing pipe where flow is to be re-directed or stopped off, the fitting is to be welded together to secure the two fitting pieces together and to the existing pipe for the transportation and delivery of liquids and gases, without leakage.

Figure 2:
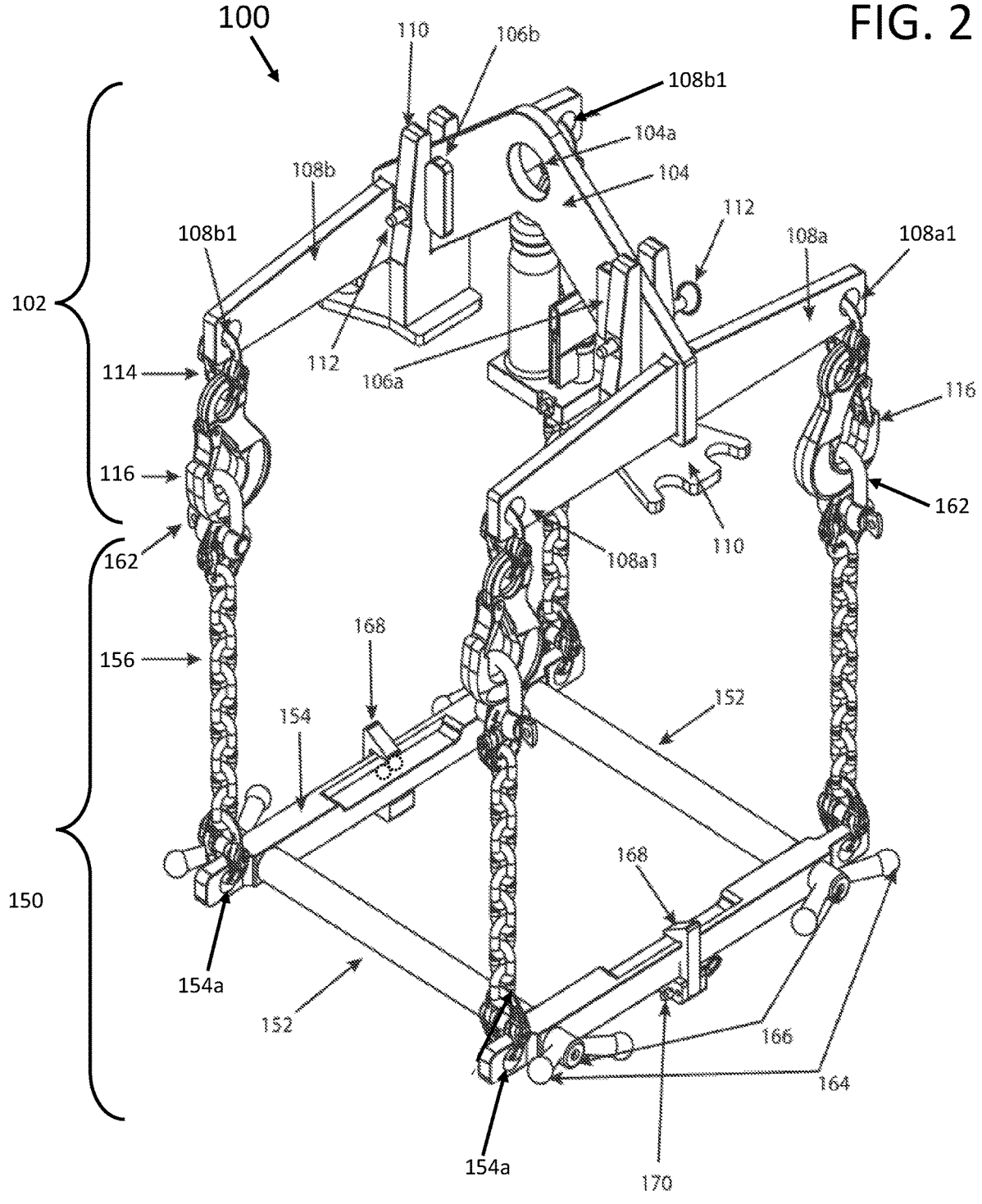
FIG. 2 illustrates an assembled perspective view of a system to suspend, move, place, align, clamp and fix for installing large pipe fittings around an existing pipe, according to an embodiment of the invention.

FIG. 2 illustrates a perspective view of a system 100 to align and install large pipe fittings 50, according to an embodiment of the invention. The system 100 to suspend, move, place, align and clamp large pipe fittings 50 around an existing large pipe, according to the embodiment of FIG. 2, can include an upper lift assembly 102 and a lower lift assembly 150. The upper lift assembly 102 and the lower lift assembly 150 are releasably attachable to each other by the use of a set of chains 156 and corresponding chain parts, as will be discussed in more detail below. However, the upper lift assembly 102 and the lower lift assembly 150 can alternatively be releasably attachable to each other by other equivalent means which will perform the intended purposes as described herein, without departing from the spirit and scope of the overall invention. Examples of alternative equivalent means for releasably attaching the upper lift assembly 102 and the lower lift assembly 150 can include, but are not limited to, linkages, cables, straps, etc.

Figure 3A:
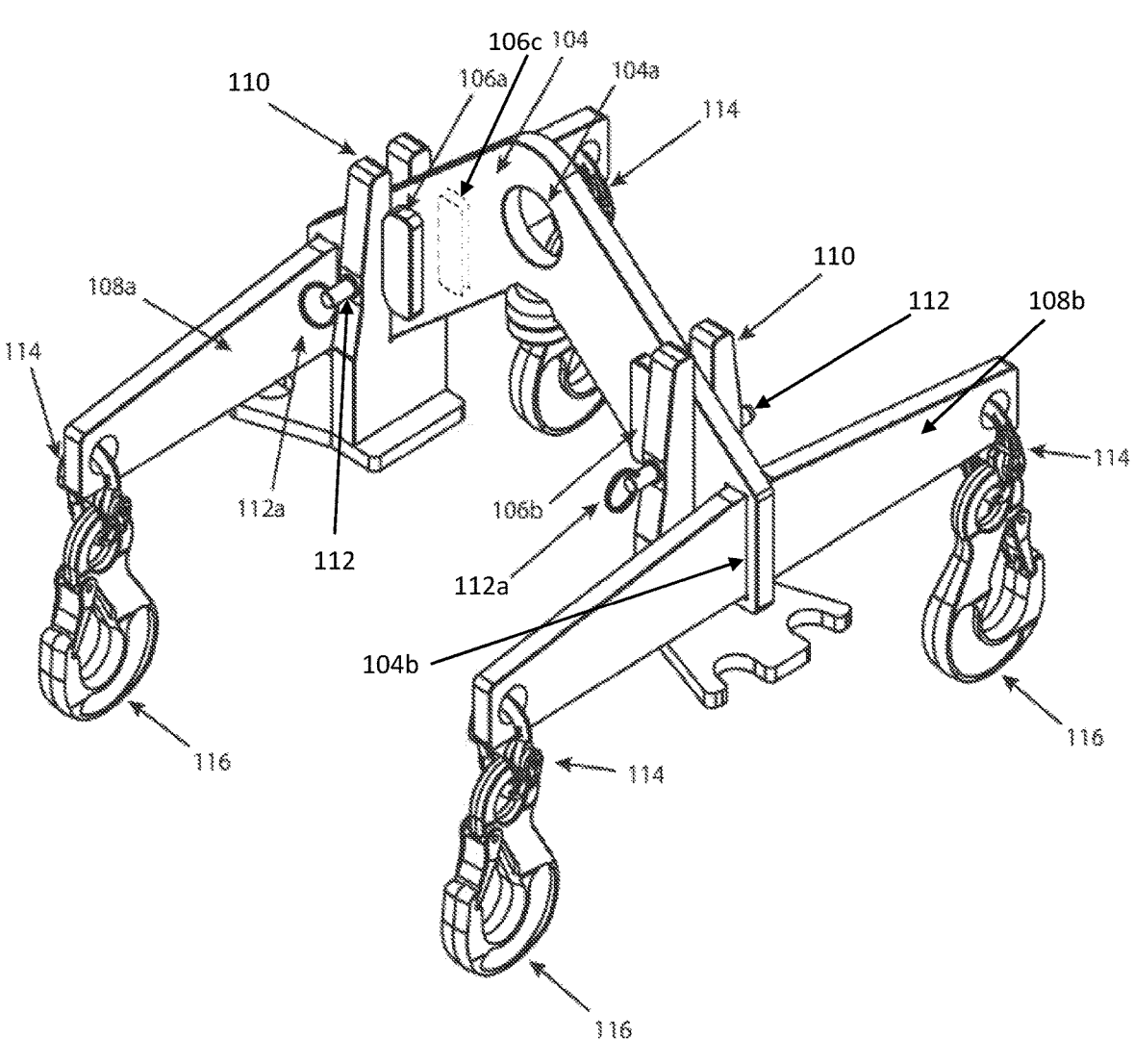
FIG. 3A illustrates a perspective view of an upper lift assembly of the system illustrated in FIG. 2, according to an embodiment of the invention.
Figure 3B:
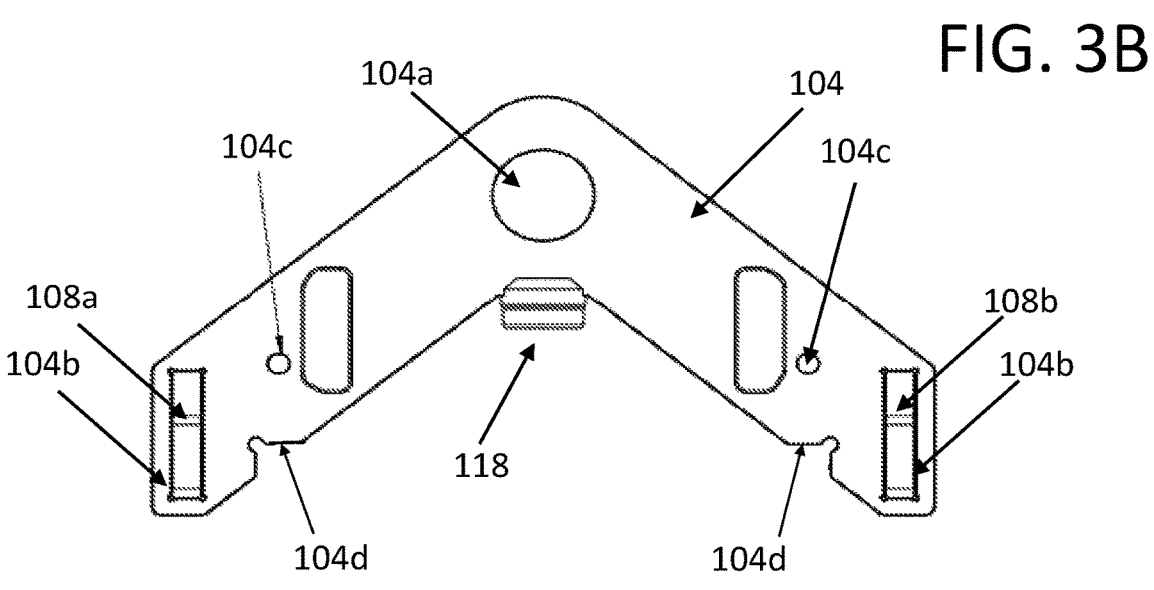
FIG. 3B illustrates a front view of the lift frame illustrated in FIG. 3A.
Figure 3C:
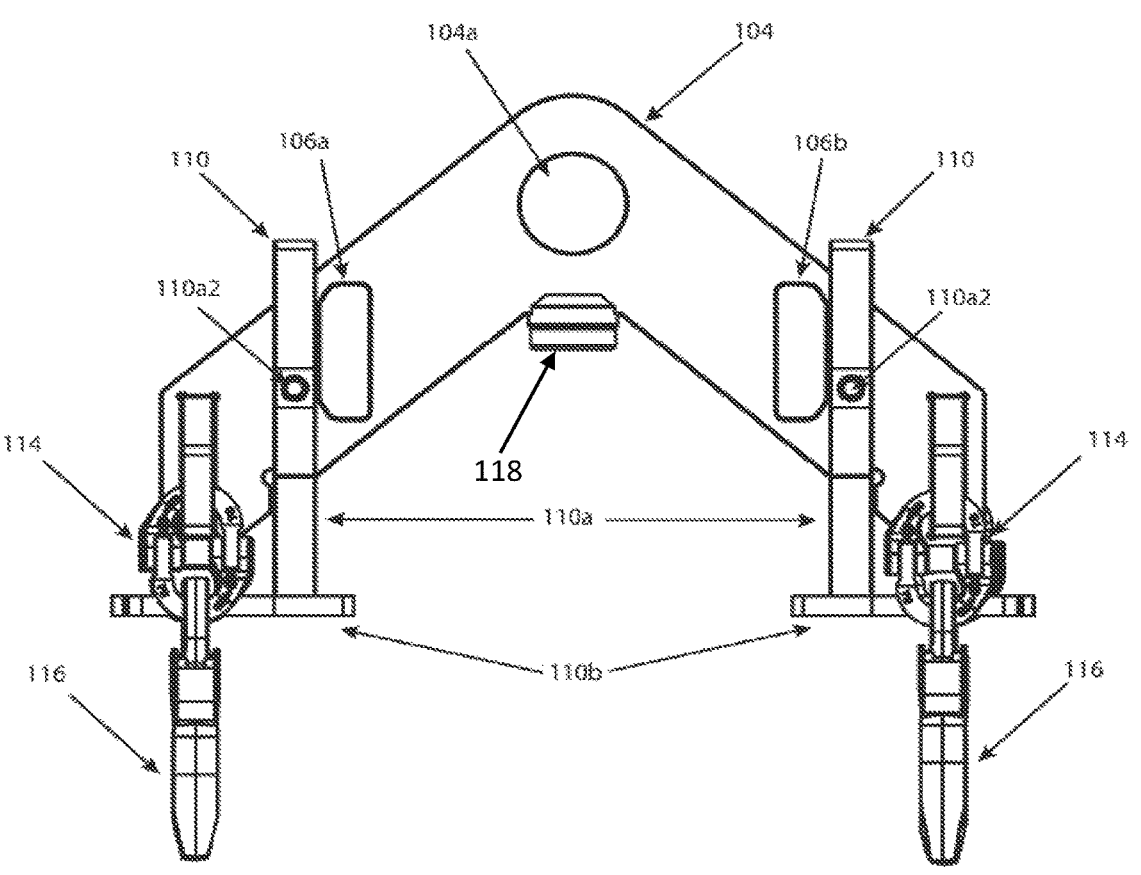
FIG. 3C illustrates another front view of the lift frame illustrated in FIG. 3A with other parts attached to it.

FIG. 3A illustrates a detailed perspective view of the upper lift assembly 102 of the system 100 shown in FIG. 2 to suspend, move, place, align and clamp for the purposes of installing large pipe fittings around an existing pipe, according to one embodiment of the invention. FIG. 3B illustrates a front view of the upper lift frame 104 illustrated in FIG. 3A, and FIG. 3C illustrates a front view of the upper life assembly 102 illustrated in FIG. 3A with a pair of crow's foot vertical runner assemblies 110 attached thereto, as will be described in more detail below.

Referring to FIGS. 2 and 3A-3C, the upper lift assembly 102 is configured to releasably couple to an upper pipe fitting portion 50a of a large pipe fitting 50. The upper lift assembly 102 can include a lift frame 104 configured in a chevron shape. However, the lift frame 104 can have alternative shapes which will provide the intended purposes as described herein. At a first side of the lift frame 104 can be disposed a first horizontal support arm 108a, and at a second side of the lift frame 104 can be disposed a second horizontal support arm 108b. The first and second horizontal support arms 108a, 108b can be inserted into corresponding grooves or slots 104b formed through the first and second sides of the lift frame 104 adjacent to ends thereof and welded within the corresponding slot 104b. Alternatively, the first and second horizontal support arms 108a, 108b can be securely connected to the ends of the first and second sides of the lift frame 104, respectively, by any equivalent means which will ensure a secure connection to be able to support and suspend a large pipe fitting. Examples of equivalent means for securely connecting the first and second horizontal support arms 108a, 108b to the ends of the first and second sides of the lift frame 104 can include, but are not limited to welding or using bolts. The lift frame 104 and first and second horizontal support arms 108a, 108b are preferably formed of a metal material, such as steel or iron. However, the lift frame 104 and first and second horizontal support arms 108a, 108b can be formed of equivalent materials which will provide sufficient strength to support large pipe fittings 50.

The first and second horizontal support arms 108a, 108b are preferably aligned in parallel with each other. The first horizontal support arm 108a can include eye holes 108a1 formed through both ends thereon, and the second support arm 108b can include eye holes 108b1 (see FIG. 2) formed through both ends thereof. Each set of eye holes 108a1 and 108b1 can include connectors 114 inserted therethrough. Each of the connectors 114 are configured to secure a corresponding hook 116 to the ends of each of the first and second horizontal support arms 108a, 108b. The hooks 116 are configured to open and close to receive and retain therein a respective chain 156, as will be described in more detail below.

The lift frame 104 can also include a pin hole 104c (see FIG. 3B) extending through each of the first and second sides thereof. More specifically, the pin holes 104c formed through the first and second sides of the lift frame 104 are preferably disposed closer to the first and second horizontal support arms 108a, 108b, respectively, than the center hole 104a. The pin holes 104c formed through each side of the lift frame 104 are provided to help attach a crow's foot vertical runner assembly 110 (see FIG. 3C) to each of the first and second sides of the lift frame 104, and are configured to receive a connector pin 112 therethrough, which is described in more detail below with respect to FIGS. 3A-3C. The lift frame 104 can also include a groove 104d formed into the bottom thereof directly under each of the pin holes 104c. The grooves 104d are provided to stabilize the crow's foot vertical runner assemblies 110 when connected to the lift frame 104, as described in more detail below with respect to FIGS. 3A and 3C.

Referring to FIGS. 3A and 3C, a crow's foot vertical runner assembly 110 is configured to include a vertical section 110a and horizontal section 110b. The vertical section 110a and the horizontal section 110b of the crow's foot vertical runner assembly 110 are preferably disposed perpendicular to each other and are connected together to form an "L" shape.

Figure 4A:
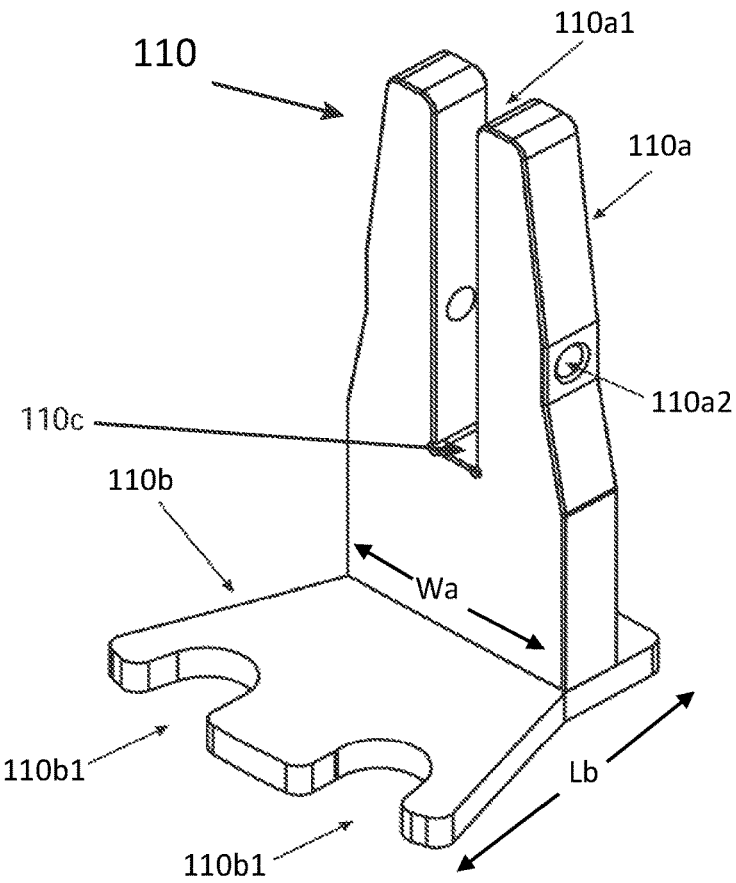
FIG. 4A illustrates a perspective view of a crow's foot vertical runner assembly of the upper lift assembly illustrated in FIG. 2, according to an embodiment of the invention.
Figure 4B:
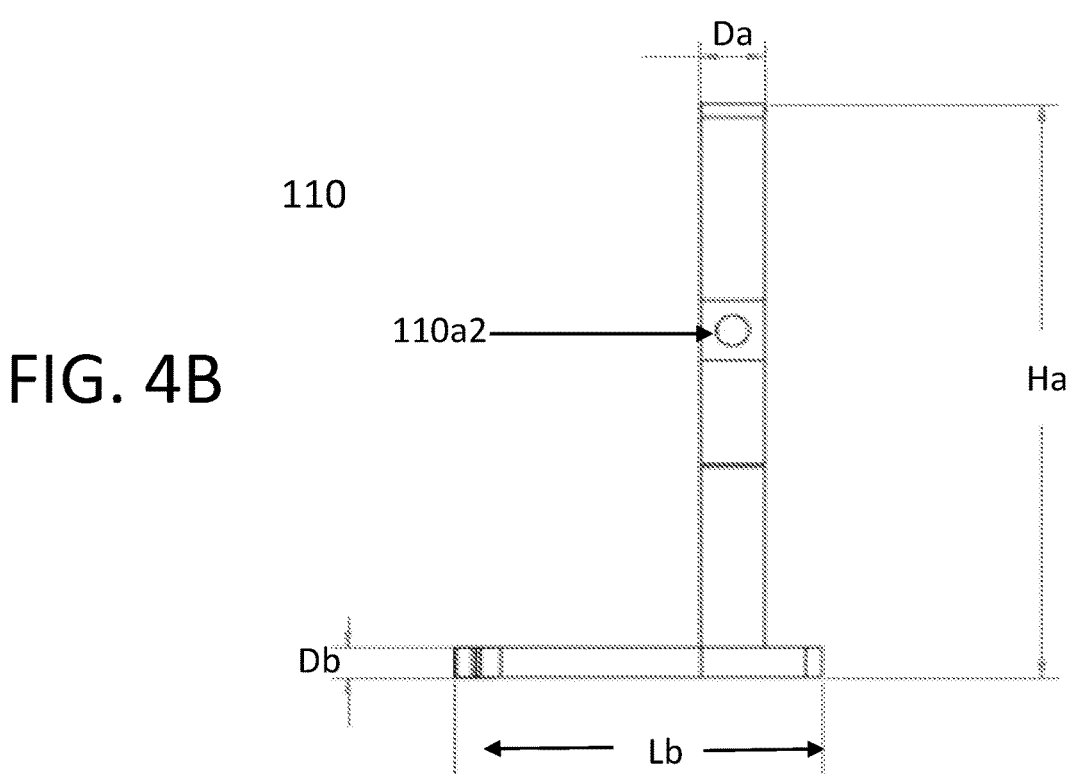
FIG. 4B illustrates a side view of the crow's foot vertical runner illustrated in FIG. 4A.

FIG. 4A illustrates a perspective view of the crow's foot vertical runner assembly 110, according to an embodiment of the invention. FIG. 4B illustrates a detailed side view of the crow's foot vertical runner assembly 110.

Referring to FIGS. 3A-3B and FIGS. 4A and 4B, the vertical section 110a of the crow's foot vertical runner assembly 110 can include a slot 110a1 formed through a center thereof and a pin hole 110a2 extending horizontally therethrough. The pin hole 110a2 is preferably disposed perpendicular to and extends through the vertical part 110a and slot 110a1. Each slot 110a1 of the crow's foot vertical runner assembly 110 is configured to receive therein one of the first side or the second side of the lift frame 104, such that the pin hole 104c in each of the first end and second sides of the lift frame 104 aligns with the pin hole 110a2 of a respective one of the crow's foot vertical runner assemblies 110 while a bottom of the slot 110a1 of the crow's foot vertical runner assembly 110 rests within the respective groove 104d of the lift frame 104. Further, a lower portion of the crow's foot vertical runner assembly 110 directly below the slot 110a1 will rest against a side of the groove 104d. By resting the bottom 110c of the slot 110a1 of the crow's foot vertical runner assembly 110 within the respective groove 104d of the lift frame 104 while the lower portion of the crow's foot vertical runner assembly 110 directly below the slot 110a1 rests against the side of the groove 104d, the lower portion of the crow's foot vertical runner assembly 110 will be prevented from moving outward toward the adjacent first or second horizontal support arm 108a, 108b.

Referring to FIGS. 4A and 4B, a height $H_a$ of the crow's foot vertical runner assemblies 110 can be approximately 9.5 inches, a depth $D_a$ of the vertical section 110a can be approximately 1 inch, and a width $W_a$ at a lower portion of the vertical section 110a and a rear portion of the horizontal section 110b can be approximately 4 inches, in accordance with an exemplary embodiment of the invention. The slot 110a1 formed in the vertical section 110a is preferably of a length sufficient to fully receive one of the first or second sides of the lift frame 104 therein while the grooves 104d rest along the bottom of the respective slot 110a1. A length $L_b$ of the horizontal section 110b can be approximately 5.67 inches, a depth $D_b$ of the horizontal section 110b can be approximately 0.5 inches.

As shown in FIG. 4A the width of the rear portion of the horizontal section 110b is the same as the width of each vertical section 110a connected to the horizontal section 110b of each crow's foot vertical runner assembly 110. However, the widths of the rear portions of the vertical section 110a and the horizontal section 110b of the crow's foot vertical runner assembly 110 can be of different dimensions depending on the size and weight of the pipe fitting 50 to be suspended. Alternatively, both the vertical section 110a and the horizontal section 110b of the crow's foot vertical runner assembly 110 can be formed as one single unit. The crow's foot vertical runner assembly 110 is preferably formed of steel or iron. However, the crow's foot vertical runner assembly 110 can alternatively be formed of any equivalent type of material which can support the weight of a pipe fitting 50.

Once the pin holes 104c through the first side or second side of the lift frame 104 are aligned with a pin hole 110a2 of a respective crow's foot vertical runner assembly 110 and the grooves 104d of the lift frame 104 rest along the bottom of the respective slot 110a1, a first quick release pin 112 can be inserted through the aligned pin holes 104c and 110a2 to secure a crow's foot vertical runner assembly 110 to each of the first or second side of the lift frame 104. The pin holes 104c extending through each of the first and second sides of the lift frame 104 are preferably positioned such that the vertical section 110a of the respective crow's foot vertical runner assembly 110 will remain substantially vertical while the sides of the grooves 104d prevent the crow's foot vertical runner assemblies 110 from rocking. With this configuration the crow's foot vertical runner assemblies 110 will be securely fastened (via the quick release pin 112) to the respective first and second sides of the lift frame 104.

To further prevent any movement of the crow's foot vertical runner assemblies 110 with respect to the corresponding side of the lift frame 104, one or more anti-tilt guide blocks 106 can be fixed at each side of the lift frame 104 at a position such that the anti-tilt guide blocks 106 will rest against back surfaces of the respective vertical section 110a of the crow's foot vertical runner assembly 110 when each side of the lift frame 104 is inserted into a corresponding groove of the crow's foot vertical runner assemblies 110. In an embodiment, one anti-tilt guide block 106 can be fixed to each side of the first end of the lift frame 104 and one anti-tilt guide block 106 can be fixed to each side of the second end of the lift frame 104. As illustrated in FIGS. 3A and 3C, anti-tilt guide blocks 106a and 106c can be fixed to each side of the first side of the lift frame 104, respectively, and anti-tilt guide blocks 106b and 106d can be fixed to each side of the second side of the lift frame 104, respectively. The anti-tilt guide blocks 106 are configured to extend along a substantial width of each side of the lift frame 104 such that rocking movement of the crow's foot vertical runner assemblies 110, with respect to the lift frame 104, is further prevented.

Still referring to FIG. 4A, the horizontal section 110b of each crow's foot vertical runner assembly 110 can include one or more notches 110b1 formed therein, and preferably a pair of notches 110b1 formed therein. These notches 110b1 are configured to slide under studs and nuts 50a1 connected to the upper fitting portion 50a of a large pipe fitting 50 (see FIG. 8). More specifically, before each of the two crow's foot vertical runner assemblies 110 are fixed to the lift frame 104, one crow's foot vertical runner assembly 110 can be slid under a first pair of the nuts and studs 50a1 secured to the upper fitting portion 50a of a large pipe fitting 50 such that the pair of nuts and studs 50a1 are received in respective notches 110b1 formed on the horizontal part 110b of the crow's foot vertical runner assembly 110. Further, the other one of the crow's foot vertical runner assemblies 110 can be slid under another second pair of the nuts and studs 50a1 (opposite the first pair) secured to the upper fitting portion 50a such that the second pair of nuts and studs 50a1 are received in the respective notches 110b1 formed on the horizontal part 110b of the other crow's foot vertical runner assembly 110. Once the two crow's foot vertical runner assemblies 110 are slid into place with respect to first and second pairs of nuts and studs the two crow's foot vertical runner assemblies 110 should both be positioned on top of the upper fitting portion 50a of a large pipe fitting 50 such that the notches 110b1 of the horizontal parts 110b are facing outward and the backs of the vertical parts 110a are facing each other.

Once the notches 110b1 of the crow's foot vertical runner assemblies 110 are engaged with respective pairs of nuts and studs 50a1 of a large pipe fitting 50, the left and right sides of the lift frame 104 can be slide into the respective grooves 110a1 of the crow's foot vertical runner assembly 110 while the vertical sections 110a of the crow's foot vertical runner assemblies 110 slide along the anti-tilt guide blocks 106 until the horizontal flats of the lift frame 104d come into contact with the flat 110c of the vertical runner slots 110a1. The pin holes on the lift frame 104 align with the pin holes 110a2 in the vertical sections 110a of the crow's foot vertical runner assembles 110. When the pin holes 104c on the lift frame 104 align with the corresponding pin holes 110a2 in the vertical sections 110a of the crow's foot vertical runner assembles 110, the first quick release pins 112 (FIG. 2) can be inserted through the pin holes 104c in the lift frame 104 and the pin holes 110a2 in the crow's foot vertical runner assembles 110 to fix the crow's foot vertical runner assemblies 110 to the lift frame 104, as illustrated in FIG. 3A and FIG. 3C. The crow's foot vertical runner assembly 110 is preferably formed of a metal material, such as steel or iron, in order to have a sufficient strength to withstand the weight of a large pipe fitting 50. However, the crow's foot vertical runner assembly 110 can be formed of any alternative equivalent material which will perform the intended purposes as stated above without departing from the spirit and scope of the overall invention.

Figure 5:
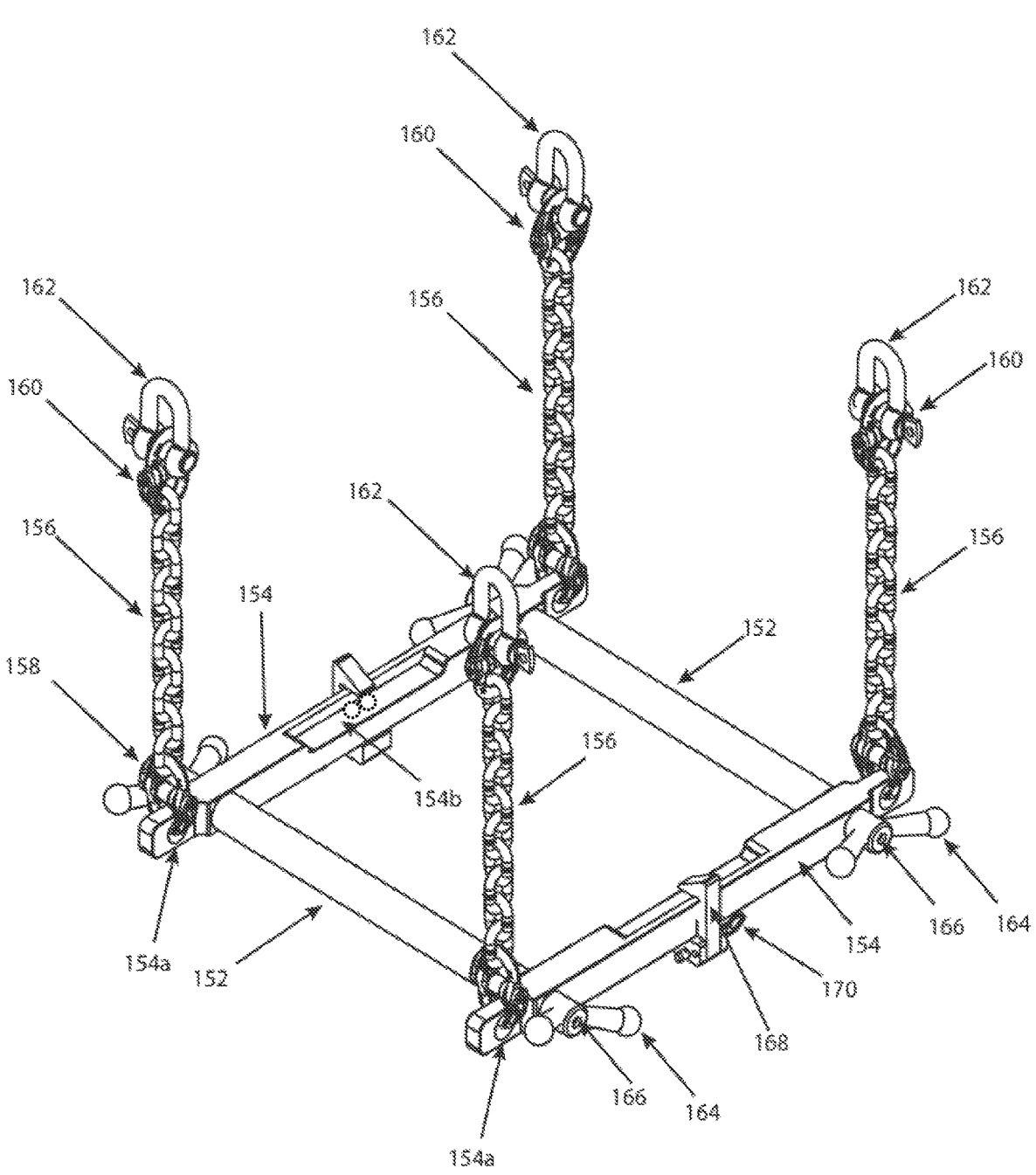
FIG. 5 illustrates a perspective view of a lower lift assembly of the system illustrated in FIG. 2, according to an embodiment of the invention.
Figure 6:
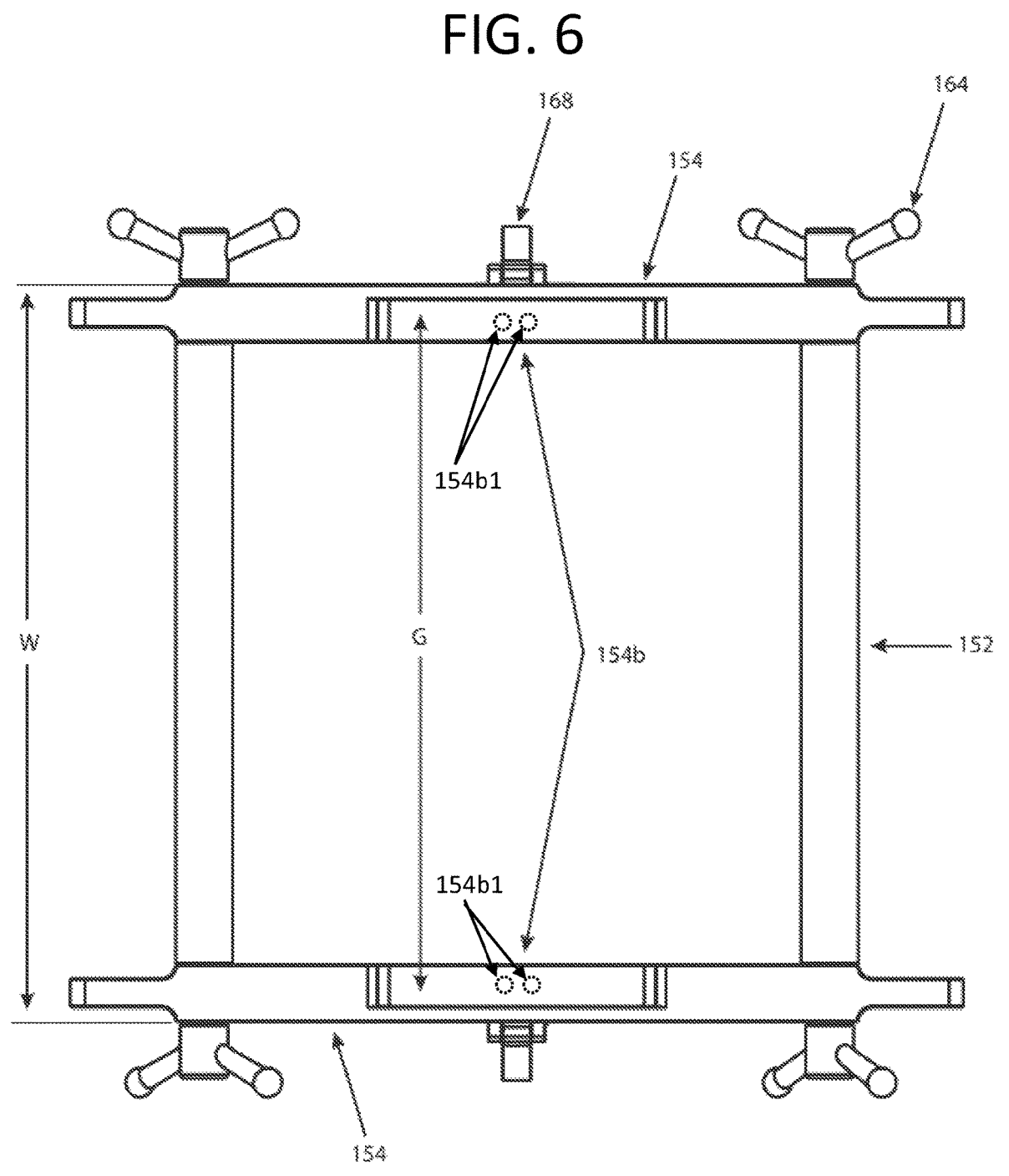

FIG. 5 illustrates a perspective view of the lower lift assembly 150 according to an embodiment of the invention, and FIG. 6 illustrates a top view of the lower lift assembly 150 illustrated in FIG. 5.

Referring to FIGS. 5 and 6, the lower lift assembly 150, also referred to as a lower cradle assembly 150, can include a set of anti-torsion crossbars 152 disposed in parallel with each other, and a set of square bars 154 also disposed in parallel with each other. The set of anti-torsion crossbars 152 and square bars 154 are preferably configured such that ends of the anti-torsion crossbars 152 are connected to ends of the square bars 154 to form a square cradle, as illustrated in FIG. 6. According to an embodiment, the ends of each square bar 154 can include a hole (not illustrated) formed therethrough to receive a corresponding distal end of the crossbars 152. More specifically, the ends of the crossbars 152 can include threads formed thereon which extend through the holes (not illustrated) formed through the respective ends the square bars 154.

Ball handles 164 can be provided on corresponding fasteners 166, wherein the fasteners 166 have threads formed therein. The threads formed in the fasteners 166 are configured to be threaded on the threads disposed on the ends of the of anti-torsion crossbars 152 such that the fasteners 166 securely fasten the four ends of the square bars 154 onto the corresponding four ends of the anti-torsion crossbars 152, thus forming the cradle. More specifically, the ball handles 164, when turned to tighten the fasteners 166 onto the respective thread of a crossbar 152, provide a clamping force to the lower portion of the fitting 50b to secure the lower portion of the fitting 50b to the lower cradle assembly 150.

In accordance with an embodiment, the anti-torsion crossbars 152 are configured to have a diameter of approximately 1.5 inches. However, the diameter of the of anti-torsion crossbars 152 can be formed of any diameter sufficient to support a large pipe fitting 50 in a suspended manner, without being compromised. The dimensions of the crossbars 152 and square bars 154 can be configured based on the size and weight of the large pipe fitting portions 50a and 50b to be moved, placed, aligned and assembled.

Each end of the square bars 154 can also include eye holes 154a extending therethrough. These eye holes 154a are preferably disposed between the holes that receive the ends of the crossbars 152 and the very ends of the square bars 154, and are configured to receive a respective connector 158 therethrough. Each connector 158 connects to one end of a respective chain 156 to connect one chain 156 to each end of the square bars 154, as described in more detail below.

Figure 8:
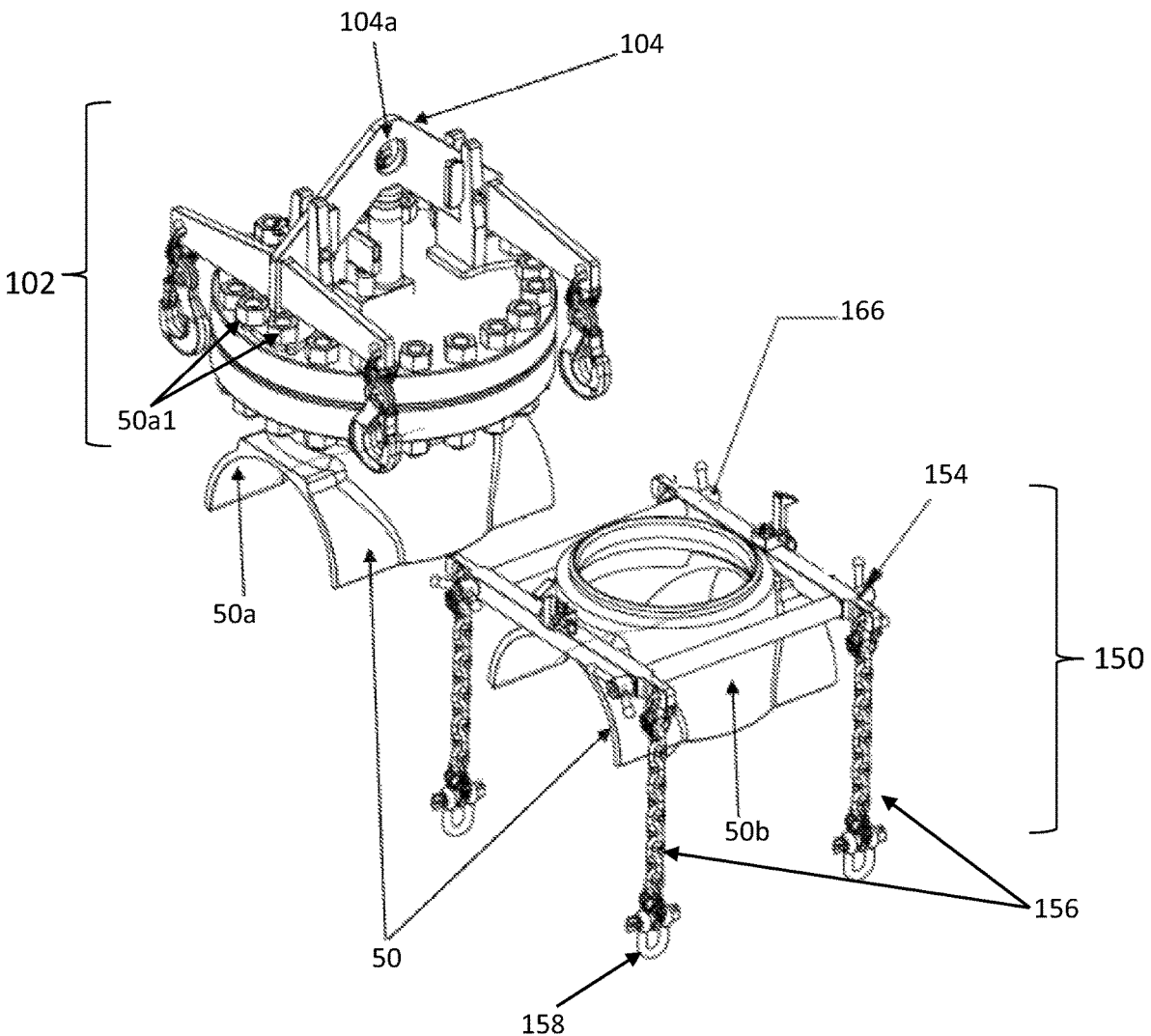
FIG. 8 illustrates a perspective view of the system to suspend, move, place, align and clamp for installing large pipe fittings around an existing pipe according to the embodiment of FIG. 2, in an operational position of being attached to a large pipe fitting.

Still referring to FIGS. 5 and 6, the middle section of each square bar 154 on a first side thereof can include a track (or groove) 154b formed therein to receive a retractable safety latch 168 therein. Each track 154b is configured to face upward when supporting a lower fitting portion 50b of a pipe fitting 50 such that the ends of the lower pipe fitting 50b can be seated therein. On an opposite side of the square bars 154 at a center thereof can be formed a pair of screw holes 154b1 to receive a respective fastener screw 168a therein, as is described in more detail below with respect to FIG. 7. A width W of the lower lift assembly (or cradle) 150, measured from an outer side of one square bar 154 to an outer side of the opposing square bar 154, is set based on the size of the pipe fitting 50 to be suspended by the cradle 150. For example, in an embodiment the width W can be approximately 19.49 inches. A distance G between outer edges of the opposing tracks 154b is configured to match the length of the lower fitting portion 50b of the pipe fitting 50. In other words, the opposite ends of the lower fitting portion 50b of the pipe fitting 50 should rest within the opposing tracks 154b, as illustrated in FIG. 8. Once the lower fitting portion 50b of the pipe fitting 50 is resting within the opposing tracks 154b, the ball handles 164 can be turned to tighten the fasteners 166 onto the respective thread of a crossbar 152, thus providing a clamping force to the lower portion of the fitting 50b to secure the lower portion of the fitting 50b to the lower cradle assembly 150.

The retractable safety latch assembly 168 is configured to prevent the lower portion of the fitting 50b from falling should the clamp pressure from the ball handles 164 not be sufficient. The safety latch assembly further securely locks one end of a lower fitting portion 50b of the pipe fitting 50 into the corresponding track 154b of the lower lift assembly (or cradle) 150, as described in more detail below with reference to FIGS. 5 and 7.

Figure 7:
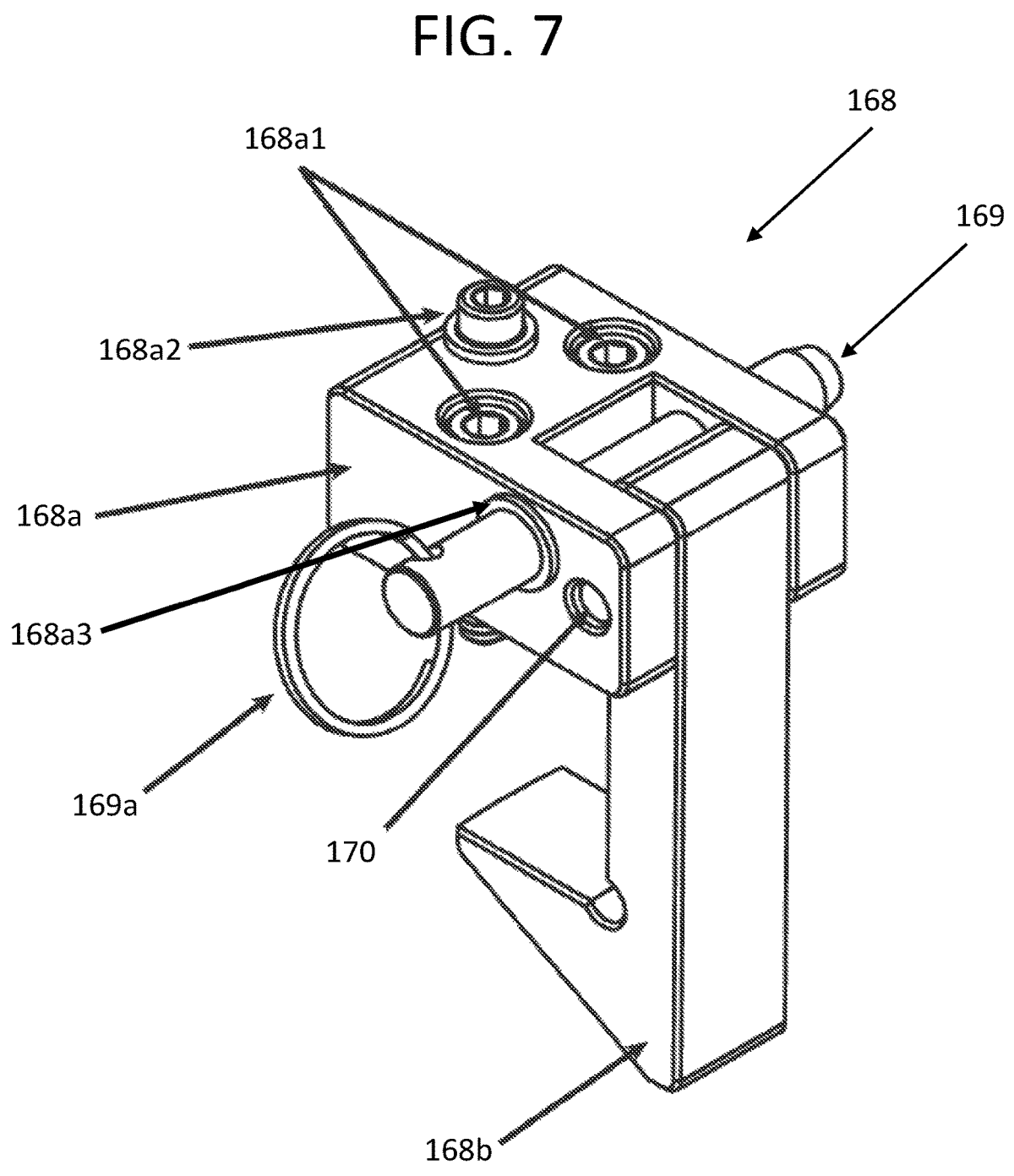

FIG. 7 illustrates a detailed perspective view of a retractable safety latch assembly 168 according to an embodiment of the invention. Referring to FIGS. 5 and 7, the retractable safety latch assembly 168 can include a safety latch base 168a having a set of fastener screws 168a1 formed therein, a retention flange bolt 168a2 and a quick release shear pin hole 168a3 formed therethrough. The fastener screws 168a1 are configured to securely fasten the safety latch base 168a of the safety latch assembly 168 to the lower side of the square bars 154. More specifically, the fastener screws 168a1 can be aligned with and threaded into a respective one of the screw holes 154b1 (see FIG. 6) formed in the square bars 154 to secure the safety latch base 168a to the square bar 154. Once the opposing ends of the lower fitting portion 50b of the pipe fitting 50 are placed into the respective tracks 154b of the lower lift assembly (or cradle) 150 and the safety latch base 168a is secured against the bottom of one of the square bars 154, a safety hook 168b, which is connected to the safety latch base 168a via a shear pin 170, can be rotated about the shear pin 170 to be disposed over the track 154b to rest above one end of the lower fitting portion 50b. A quick release shear pin 169 can then be inserted into the quick release shear pin hole 168a3 of the safety latch base 168a to lock the safety hook 168b in place over the end of the lower fitting portion 50b. The same process can then be performed using the second retractable safety latch assembly 168 for the opposite end of the lower fitting portion 50b.

FIG. 8 illustrates a process of connecting the lower lift assembly 150 to a lower fitting portion 50b of a pipe fitting 50. The lower lift assembly 150 is placed over a lower fitting portion 50b of a pipe fitting 50 such that the two ends of the lower fitting portion 50b are placed in the two corresponding tracks 154b of the square bars 154 (see FIG. 6). As illustrated in FIG. 8, when the lower fitting portion 50b is being seated in the two tracks 154b the safety hooks 168b on both safety latch assemblies 168 are in a retracted position. Once the lower fitting portion 50b is fully seated in the two tracks 154b by rotating the ball handles 164 and clamping the lower fitting portion 50b between the two square bars of 154, the safety hooks 168b can be pivoted to be positioned over the two corresponding ends of the lower fitting portions 50b. At this point the quick release shear pins 169 can be inserted into the quick release shear pin holes 168a3 to lock the safety hooks 168b over the ends of the lower fitting portions 50b to securely fasten the lower lift assembly (or cradle) 150 to the lower fitting portion 50b of the pipe fitting 50. Referring back to FIG. 7, each quick release shear pin 169 can include a quick release shear pin ring 169a, which enables the shear pin 169 to be quickly pulled out of the quick release shear pin hole 168a3 in order to quickly release the safety hooks 168b from the corresponding ends of the lower fitting portion 50b of the pipe fitting 50. Once the shear pins 169 are pulled out of the quick release shear pin holes 168a3, the lower fitting portion 50b of the pipe fitting 50 can be released from the lower lift assembly 150. A cable or wire can be connected at one end to the retention flange bolt 168a2 and at an opposite end to the quick release shear pin ring 169a in order to avoid losing the quick release shear pin 169 when not inserted through the quick release shear pin hole 168a3.

Figure 9:
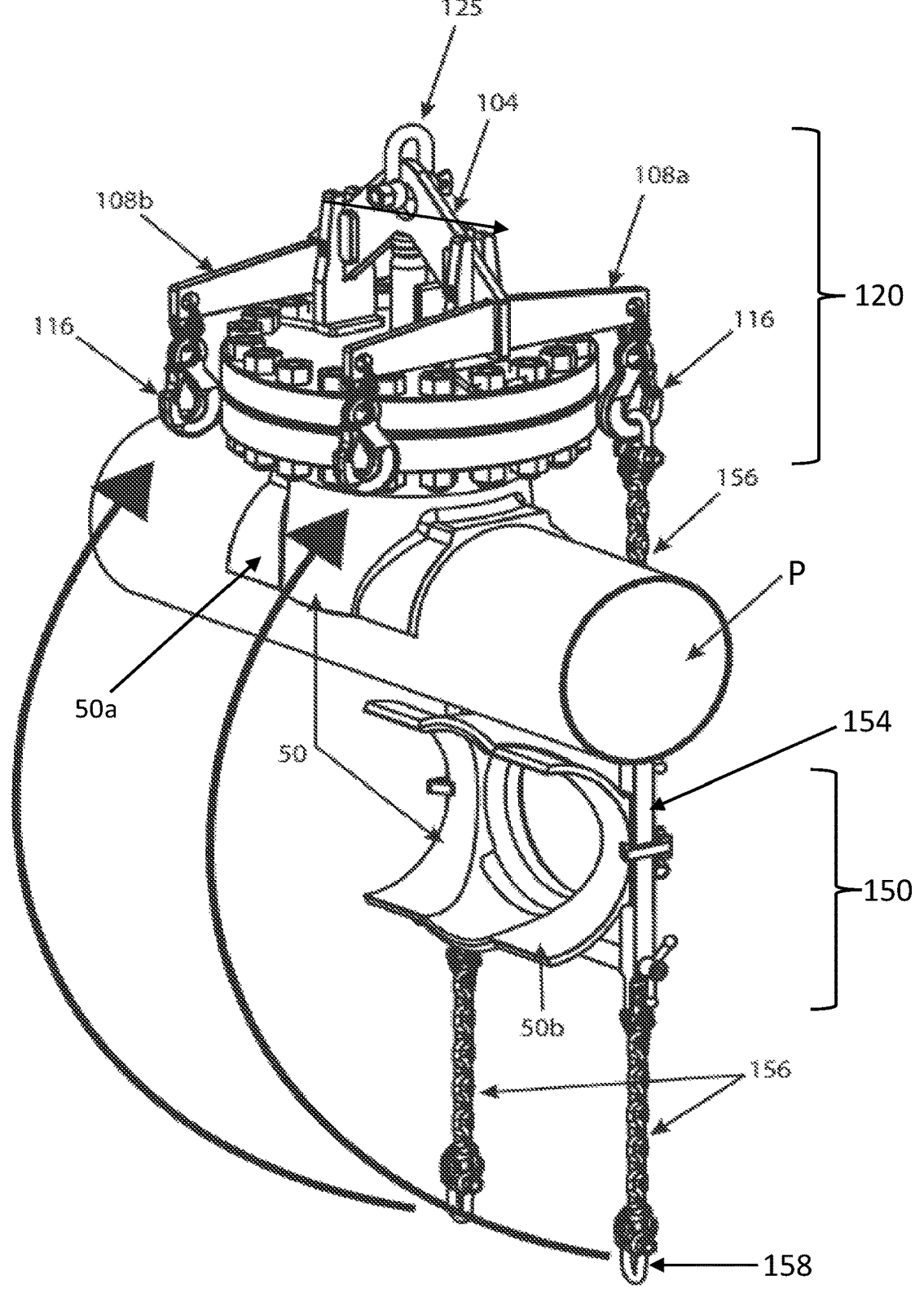
FIG. 9 illustrates a perspective view of the system to suspend, move, place, align and clamp for installing large pipe fittings around an existing pipe according to the embodiment of FIG. 2, in an operational position of bringing together upper and lower portions of a large pipe fitting to a large pipe.

FIG. 9 illustrates a process of placing a pipe fitting 50 on a pipe P using the system 100, according to an embodiment of the invention. Referring to FIG. 9, once the lower lift assembly 150 is securely fastened to a lower fitting portion 50b of a pipe fitting 50 according to the process described above with reference to FIGS. 7 and 8, the lower lift assembly 150 can be connected to the upper lift assembly 102. More specifically, a chain 156 can be connected to each of the four eye holes 154a of the square bars 154. Then a second end of two chains 156, connected to first ends of the two square bars 154, respectively, can be hooked into a releasable hook 116 connected to first ends of the first horizontal support arm 108a and the second horizontal support arm 108b, respectively. As pointed out above, each chain includes a respective shackle 162 at one end thereof to be hooked by a corresponding hook 116.

At this point the upper lift assembly 102 can be hoisted up with a crane or other mechanical hoisting machinery by the lifting eye 104a disposed at the center of the lifting frame 104. To assist with easy attachment of the upper lift assembly 102 to a hoisting machine, a shackle 125 can be inserted through the lift frame eye 104a, such that a hook or other latching device can easily hook onto and be unhooked from the upper lift assembly 102 via the shackle 125. The upper lift assembly, lower lift assembly with corresponding upper and lower portions of the fitting can then be placed on an existing pipe P. Then the two remaining chains 156 can be swung upward, as illustrated by the two curved arrows, to hook the shackles 162 into the two corresponding remaining hooks 116 extending from the second ends of each of the first horizontal support arm 108a and the second horizontal support arm 108b. At this point the lower pipe fitting 50b will be aligned with the upper pipe fitting 50a.

Figure 10:
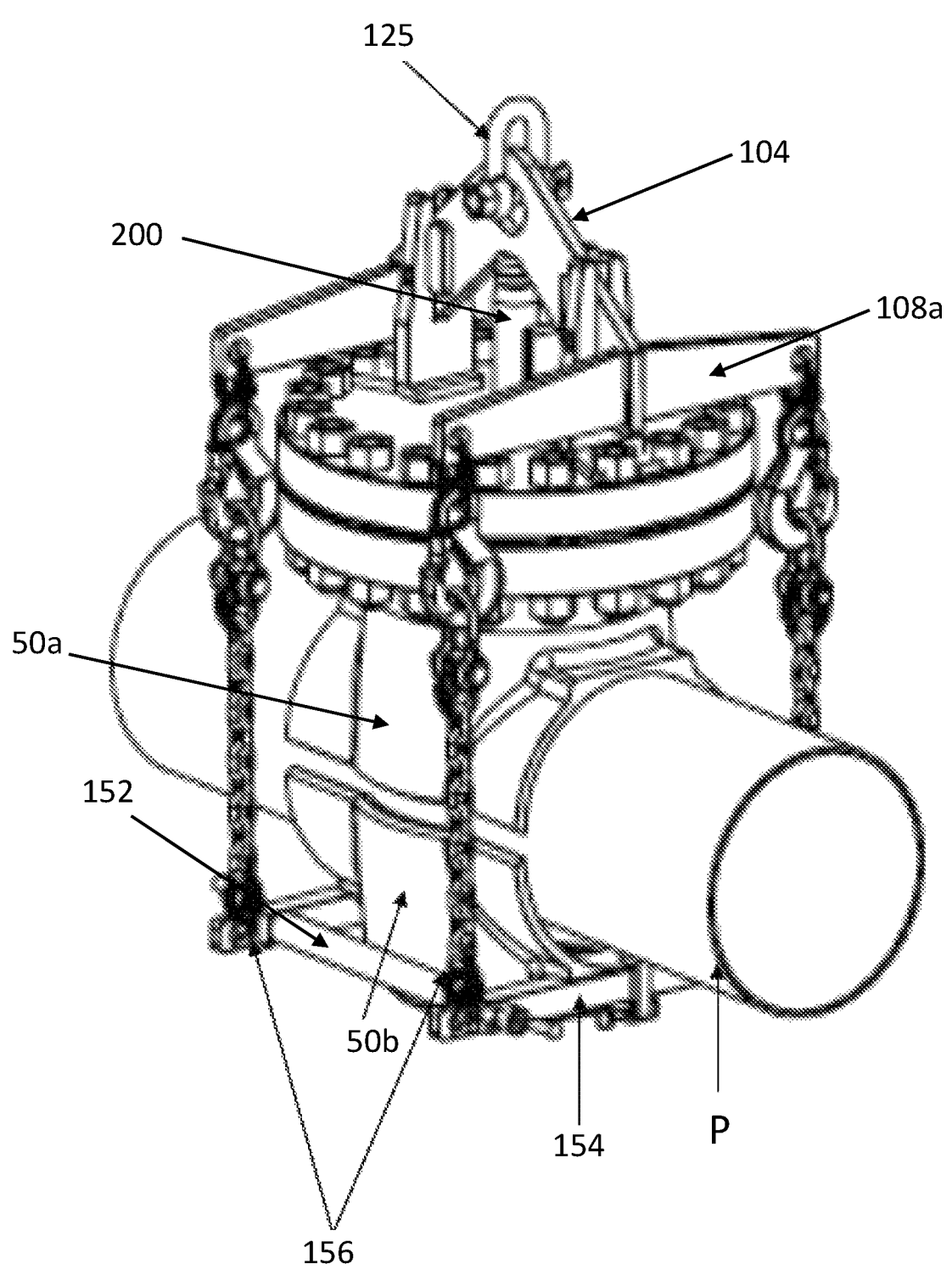
FIG. 10 illustrates a perspective view of the system to suspend, move, place, align and clamp for installing the large pipe fitting around an existing pipe according to the embodiment of FIG. 2, in an operational position of securing upper and lower portions of a large pipe fitting to a large pipe.

FIG. 10 illustrates a process of securing the lower pipe fitting portion 50b of the pipe fitting 50 with the upper fitting portion 50a of the pipe fitting 50. Referring to FIG. 10, a jack 200 can be disposed between the upper pipe fitting portion 50a of the pipe fitting 50 and an underside of the center of the lift frame 104. The jack 200 provides a lifting force to the upper lift assembly 102 and accordingly, via the chains 156, the jack 200 will also provide a lifting force to the lower cradle assembly 150. By pressing off the top portion of the fitting 50a lifting both the upper lift assembly 102 and the lower cradle assembly 150, with respect to the upper pipe fitting 50a, edges of the lower pipe fitting portion 50b will be moved toward edges of the upper pipe fitting portion 50a while a good alignment between both pipe fitting portions 50a and 50b will be consistently maintained. Prior to applying pressure to the upper lift assembly 102 with the jack 200, the first and second quick release pins 112 must be removed from the pin holes 110a2 formed through the crow's foot vertical runner assemblies 110 and the pin holes 104c formed through the lift frame 104, and the two safety hooks 168b must be pivoted away from the space between the upper pipe fitting portion 50a and the lower pipe fitting portion 50b by pulling out the two quick release shear pins 169 via the quick release safety pin rings 169a. At this point the edges of the lower pipe fitting portion 50b and the upper pipe fitting portion 50a can be pressed together with the assistance of the jack 200.

Figure 11:
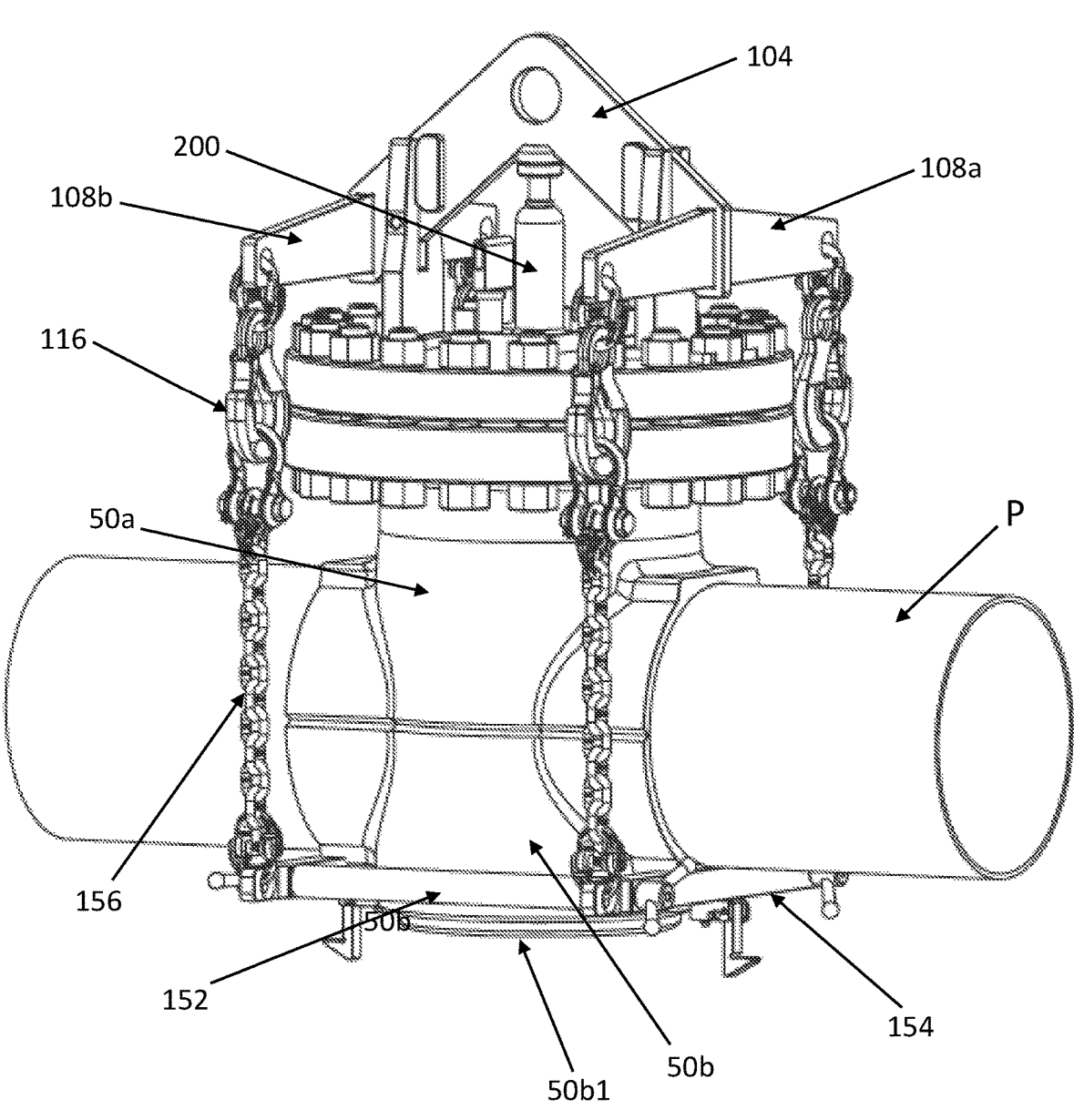
FIG. 11 illustrates a perspective view of the system to suspend, move, place, align and clamp for installing the large pipe fitting around an existing pipe according to the embodiment of FIG. 2, in an operational position of pressing together upper and lower portions of the large pipe fitting to an existing large pipe.

FIG. 11 illustrates where the jack 200 has applied a force to merge the edges of the lower pipe fitting portion 50b and the edges of the upper pipe fitting portion 50a. At this point the edges of the lower pipe fitting portion 50b and the edges of the upper pipe fitting portion 50a can be easily welded together while remaining in aligned and pressing contact with each other with the assistance of the system 100 to align and install large pipe fittings and the jack 200.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system for moving, placing, aligning and clamping upper and lower pipe fitting portions of a pipe fitting around an exterior surface of an existing pipe of a type used for transporting fluid such as water, oil and gas, the existing pipe having a central longitudinal axis, and the upper and lower pipe fitting portions each include an interior surface having a semicircular cross section and two parallel longitudinal edges spaced apart by a distance corresponding to an outside diameter of the existing pipe around which they are to be installed, wherein the upper pipe fitting portion has a planar top surface, the system comprising:

an upper lift assembly comprising:

a first sub-assembly constructed to be releasably fixed to the planar top surface of the upper pipe fitting portion; and a second sub-assembly arranged to be releasably slidable in a direction perpendicular to the planar top surface of the upper pipe fitting portion and having a connector to connect the second sub-assembly to an external lifting device for moving and placing the upper lift assembly together with the upper pipe fitting portion above the existing pipe; and a lower lift assembly configured to form a cradle system to receive and releasably hold a bottom region of the lower pipe fitting portion; and a suspension arrangement connected between the upper lift assembly and the lower lift assembly to permit vertically suspending the cradle system from the second sub-assembly;

wherein when the second sub-assembly is released to slide relative to the first sub-assembly in the upper lift assembly, an upward force applied to the second sub-assembly causes an upward movement of the second sub-assembly relative to the first sub-assembly and the upper pipe fitting portion which, because of the suspension arrangement moves the lower lift assembly with the lower pipe fitting portion upwards to bring the horizontal edges of the lower pipe fitting portion into contact with the horizontal edges of the upper fitting portion.

2. The system according to claim 1, wherein the cradle system of the lower lift assembly includes two sets of spaced apart parallel bars arrange with one set of parallel bars being perpendicular to the other set, wherein the one set of parallel bars has end regions with an adjustable connection to end regions of the other set of parallel bars to form a generally square cradle having four corner regions with an open interior space having a distance between the one set of parallel bars being adjustable, and each bar of the one set parallel bars has a centrally arranged recessed track that presents an outer vertical lip, each recessed track being configured to receive one end of the lower pipe fitting therein so that opposite ends of the lower pipe fitting portion rest on the respective recessed track and a distance between the one set of parallel bars is adjustable via the adjustable connection to clamp the vertical lips against the respective ends of the lower pipe fitting portion.

3. The system according to claim 2, further including a safety latch releasably attachable to a center of and outside each bar of the one set of bars and including a rotatable safety hook configured to rotate to a position directly above the track and a pinhole to receive a quick release pin therein to lock the safety hook above the track to secure the end of the lower pipe fitting portion within the respective track.

4. The system according to claim 2, wherein the second sub-assembly of the upper lift assembly comprises:

an elongated, generally upside-down V-shaped lift frame having a central region presenting a connection for an external lifting device and first and second legs sloping downwardly from the central region with each leg having a free end and a bottom surface with a groove having a horizontally extending surface located closer to the free end of the leg than to the central region; and four horizontal support arms including two horizontal support arms near the free end of each leg of the lift frame and extending in opposite directions perpendicularly to the lift frame with each horizontal support arm having a free end with a connector; and the first sub-assembly comprises two vertical runner assemblies arranged on opposite sides of the central region for releasably supporting, respectively, the first and second legs of the lift frame, each vertical runner assembly including:

a vertical section defining a U-shaped slot formed by two upwardly extending vertical legs separated by a flat bottom surface, wherein the horizontally extending groove of each leg of the lift frame rests on the bottom flat surface of the U-shaped slot, the vertical section including a pinhole formed widthwise through the two upwardly extending vertical legs to align with a corresponding pinhole in the lift frame; and a quick release pin configured to be inserted through the pin hole of the two upwardly extending vertical legs and the aligned pinhole in the lift frame to lock the first sub-assembly in place, wherein removal of the quick release pin from the vertical section of each of the two vertical runner assemblies permits upward movement of the lift frame with the four horizontal support arms; and a horizontal section fixed to the vertical section and releasably fixed to the upper planar surface of the upper pipe fitting portion.

5. The system of claim 4, wherein the suspension arrangement comprises four non-extendable linkages or bands, each linkage being releasably connected between one of the corner regions of the generally square cradle and one of the four end regions of the shoulder located vertically directly above corner region to which the linkage is releasably connected.

6. The system according to claim 4, further including a controllable power source including a jack for being arranged, in use, between the upper surface of the upper pipe fitting and an under surface of the lift frame for applying the upward force to the lift frame, wherein with removal of the first and second quick release pin and activation of the power source the jack pushes against the lift frame resulting in an upward movement of the lift frame in the U-shaped slot of the vertical section, further resulting in an upward movement of the lower assembly suspended from the upper assembly until the edges of the upper and lower pipe fittings meet.

7. The system according to claim 6, where in the power source is one of electrical or gas or pneumatic to power the jack which could be a linear or screw type jack.

8. The system according to claim 4, further comprising anti-tilt guide blocks attached to front and back sides of the lift frame adjacent the respective upward extending leg of the vertical section such that the vertical section of respective vertical runner assemblies slides along the anti-tilt blocks when receiving the corresponding front and back side of the lift frame.

9. A method of suspending, moving, placing, aligning and clamping upper and lower pipe fittings together around an existing pipe employing the system according to claim 1, comprising:

engaging the upper lift assembly to the upper pipe fitting portion;

engaging the lower lift assembly to the lower pipe fitting portion;

connecting a first side of the upper lift assembly to a first side of the lower lift assembly with a first portion of the suspension arrangement;

lifting the upper lift assembly until both the upper lift assembly and the lower lift assembly are suspended in air;

swinging a second side of the lower lift assembly opposite the first side of the of the lower lift assembly toward a second side of the upper lift assembly opposite a first side of the upper lift assembly until the lower pipe fitting portion is directly under and aligned with the upper pipe fitting portion;

connecting the second side of the lower lift assembly to the second side of the upper lift assembly via a second portion of the suspension arrangement; and pressing the lower pipe fitting portion and the upper pipe fitting portion together with the upper and lower pipe fitting assemblies.

10. The method of claim 9, wherein:

the engaging the upper lift assembly to the upper pipe fitting portion comprises engaging the first sub-assembly of the upper lift assembly to the planar top surface of the upper pipe fitting portion and removably attaching the first sub-assembly of the upper lift assembly to the second sub-assembly of the upper lift assembly;

the connecting the first side of the upper lift assembly to the first side of the lower lift assembly comprises forming a connection between a first side of the second sub-assembly of the upper lift assembly and the first side of the lower lift assembly via the first portion of the suspension arrangement;

preventing the upper lift assembly engaged with the upper fitting portion and the lower lift assembly engaged with the lower fitting portion from rolling over by maintaining a connection of the external lifting device through a connector in the second sub-assembly of the upper lift assembly to the lower lift assembly via the first portion of the suspension arrangement;

the swinging the second opposite side of the lower lift assembly toward the second opposite side of the upper lift assembly comprises swinging the second side of the lower lift assembly toward a second side of the second sub-assembly of the upper lift assembly until the lower pipe fitting portion is directly under and aligned with the upper pipe fitting portion;

the connecting the second side of the lower lift assembly to the second side of the upper lift assembly comprises connecting the second side of the second sub-assembly to the second side of the second sub-assembly of the upper lift assembly; and the pressing the lower pipe fitting portion and the upper pipe fitting portion together with the upper and lower lift assemblies comprises detaching the first and second sub-assemblies of the upper lift assembly and forcing the second sub-assembly of the upper pipe fitting assembly away from the first sub-assembly of the upper lift assembly while the first sub-assembly of the upper lift assembly remains engaged with the upper portion of the pipe fitting such that the lower lift assembly is raised to force the lower pipe fitting portion against the upper pipe fitting portion to align and clamp to together the upper and lower pipe fitting portions.

11. The method according to claim 9, wherein the engaging the lower lift assembly to the lower pipe fitting portion includes press fitting ends of the lower pipe fitting portion between two opposing sides of the lower lift assembly.

12. The method of claim 11, wherein the engaging the lower pipe fitting portion to the lower lift assembly includes rotating a retractable safety latch formed at each of the two opposing sides of the lower lift assembly over the two opposing ends of the lower pipe fitting portion.

13. The method according to claim 10, wherein the forcing of the second sub-assembly of the upper lift assembly away from the first sub-assembly of the upper lift assembly while the first sub-assembly of the upper lift assembly remains engaged with the upper portion of the pipe fitting is performed by inserting a mechanical lifting device between the upper pipe fitting portion and the second sub-assembly of the upper lift assembly and activating the mechanical lifting device to force the second sub-assembly upwardly away from the upper pipe fitting portion.

14. The method according to claim 10, wherein the attaching and detaching the first sub-assembly of the upper lift assembly and the second sub-assembly of the upper lift assembly is performed by inserting and removing at least one quick release pin from aligned pin holes formed in both the first and second sub-assemblies of the upper lift assembly.

* * * * *